United States Patent

Holt

[11] Patent Number: 5,896,448
[45] Date of Patent: Apr. 20, 1999

[54] METHOD AND APPARATUS FOR ROUTING CALLS BASED ON CALL SUCCESS HISTORY

[75] Inventor: Scott C. Holt, Atlanta, Ga.

[73] Assignee: BellSouth Corporation, Atlanta, Ga.

[21] Appl. No.: 08/768,126

[22] Filed: Dec. 17, 1996

[51] Int. Cl.⁶ .................................................. H04M 3/42
[52] U.S. Cl. ........................ 379/211; 379/201; 379/210
[58] Field of Search .................................. 379/211, 210, 379/212, 201, 207, 913

[56] References Cited

U.S. PATENT DOCUMENTS

| | | | |
|---|---|---|---|
| 4,313,035 | 1/1982 | Jordan et al. | 379/211 |
| 4,740,788 | 4/1988 | Konneker | 379/211 |
| 4,752,951 | 6/1988 | Konneker | 379/211 |
| 4,769,834 | 9/1988 | Billinger et al. | 379/207 |
| 5,276,731 | 1/1994 | Arbel et al. | 379/201 |
| 5,392,342 | 2/1995 | Rosenthal | 379/211 |
| 5,412,708 | 5/1995 | Katz | 379/39 |
| 5,430,791 | 7/1995 | Feit et al. | 379/211 |
| 5,436,965 | 7/1995 | Grossman et al. | 379/266 |
| 5,535,270 | 7/1996 | Doremus et al. | 379/266 |
| 5,553,129 | 9/1996 | Partridge, III | 379/211 |
| 5,555,297 | 9/1996 | Ochy et al. | 379/201 |
| 5,706,339 | 1/1998 | Eisdorfer et al. | 379/211 |

FOREIGN PATENT DOCUMENTS

| | | |
|---|---|---|
| WO 91/03137 | 3/1991 | WIPO . |
| WO 91/07838 | 5/1991 | WIPO . |
| WO 91/11874 | 8/1991 | WIPO . |

*Primary Examiner*—Daniel S. Hunter
*Assistant Examiner*—Benny Q. Tieu
*Attorney, Agent, or Firm*—Jones & Askew, LLP

[57] ABSTRACT

A method and apparatus for routing calls for a subscriber based on the probability of call completion for a set of routing destinations. The present invention operates to route calls to destinations in a routing list, maintain a success indicator for each routing attempt, and route calls based on the success indicator. When a call is received, the routing list is sorted according to a call completion probability indicator associated with each destination. Destinations will be selected in accordance to the sorted order (325), and the call will be routed to that destination (350). If the routed call is not answered (355), the next destination will be extracted from the list and the call will be routed thereto (350). If the call is answered (355), an identification announcement is provided to the answering party (360), and processing will wait until disposition information is received (365). If the disposition information indicates that the call is accepted by the answering party, the call completion probability indicator will be updated and the call will be established (375). If the disposition information indicates that the call is rejected by the answering party, the call will be routed to a default destination and the call completion probability indicator will be updated (380). If the call is neither accepted nor rejected, the next destination will be extracted from the routing list and the call will be routed thereto (350).

22 Claims, 6 Drawing Sheets

METHOD AND APPARATUS FOR ROUTING CALLS BASED ON CALL SUCCESS HISTORY

RELATED APPLICATIONS

Application Ser. No. 07/936,384, filed Aug. 26, 1992, entitled "Personal Number Communications System", assigned to BellSouth Corporation, the assignee of the present application, is attached hereto as Appendix A. Application Ser. No. 07/936,384 discloses a preferred embodiment of an integrated telecommunications system that can serve as an operational platform of the present invention and is incorporated herein by reference. If application Ser. No. 07/936,384 is allowed, then Appendix A will be canceled and reference to the allowed application will be substituted as provided by MPEP §608.01(p). If application Ser. No. 07/936,384 is not allowed or is abandoned, then Appendix A will be incorporated into the specification of this application by amendment.

TECHNICAL FIELD

The present invention relates to the field of switched telephony, and in particular, is a method of routing calls to a subscriber based on the call success history of a list of selected destinations.

BACKGROUND OF THE INVENTION

As technological advances are made in communication equipment, and computers are more highly integrated into the telecommunication networks and systems, the ultimate goal of communication service providers: obtaining "real-time", "seamless" access to all parties, is becoming an ascertainable target. "Real-time" access includes the ability to contact a party instantaneously as opposed to paging the party or leaving a message. "Seamless" access includes the ability to reach a party regardless of the party's physical location, or the time of day. Thus, there are few moments when the party cannot be contacted. The task of maintaining seamless access with a moving party is difficult.

One solution presently in operation is the Personal Number Service ("PNS"), which is described in commonly owned U.S. application Ser. No. 07/936,384. PNS from BellSouth Wireless gives a subscriber the ability to be in contact with other callers regardless of the subscriber's location. PNS provides a single point of contact for each subscriber in the form of a personal number. Thus, the personal number is used to access the subscriber at various destination numbers. The personal number can be a special number dedicated to the personal number system or can be a mobile phone number which the system recognizes. Each subscriber provides the system with communication routing information in the form of one or more "destination lists" or "routing lists". Each routing list contains the various directory numbers where the subscriber can be contacted. The subscriber also has the flexibility to change the routing lists or alter the manner in which they are utilized. Methods to alter the use of the routing lists include enabling an "override" feature. The override feature allows the subscriber to disable the use of the routing list for a particular caller or all callers, and force the incoming call to be routed to a particular alternate number. Upon disabling the override feature, the system will resume the use of the routing lists. Another feature of the personal number communication system is to allow the subscriber to provide different routing lists for different days of the week or specific time slots within the day. Thus, one routing list may be used on weekdays from 9:00 AM to 6:00 PM, another routing list on weekdays after 6:00 PM, and a third routing list on weekends.

The general operation of the PNS call routing feature can be described in the following steps:

(1) When a call is placed to a subscriber's personal number, the telephone system will receive the call.

(2) The telephone system will then identify the number that was called as belonging to a subscriber of the personal number communication system and will then determine the type of service to be provided.

(3) Finally, if the call requires routing, a routing list will be retrieved and call attempts to the various destinations will be made until the subscriber is located; however, if the subscriber cannot be located, the incoming call will be routed to a default destination such as voice mail.

More specifically, when the telephone system detects that a call to a personal number has been initiated, PNS first determines if the personal number includes facsimile services. If so, the system will first determine whether or not the call attempt is a facsimile transmission. If the call is a facsimile transmission, then the system will store the facsimile data until the subscriber retrieves this information at a later time. If the call attempt is not a facsimile transmission, then the system will determine whether the call is an administration call. An administration call is initiated by the subscriber and allows the subscriber to modify his service options, retrieve any voice mail that might have previously been stored, or obtain prior facsimile transmissions. If the call is not an administration call, the system will then check to see if the incoming call is a priority call. For priority calls, the system indicates to the subscriber that the call being received is from a priority caller.

Finally, if the call requires a routing service, the PNS will identify the calling party and prepare an identification announcement for the subscriber. The identity of the calling party may be determined by performing a reverse white pages database lookup based on the phone number of the calling party or by prompting the calling party to provide identification by either making a voice announcement or by keypad entries. Next, the PNS provides the calling party with a personal greeting from the subscriber, or a standard greeting, which requests the calling party to hold while an attempt to place the call is made.

While the calling party is holding, the PNS continues by retrieving a routing list for the subscriber based on the time of day or day of the week or any other system established criteria. Next, the numbers in the selected routing list will be sequentially accessed until either the call has been successfully routed, rejected, or the list has been exhausted. The routing operation is performed by: placing the received call on hold; selecting a first directory number from the routing list; placing a second call to the selected number; and if it is accepted, connecting the two calls. If the number selected is a mobile phone number, the system will determine if the mobile phone is powered on prior to redirecting the call. This determination is made by verifying whether an autonomous registration for that mobile number has been recently received. The autonomous registration is an indication that the mobile is on and is within the service provider area. Once the first destination has been selected (and the phone is powered on in the case of a mobile number), the system places lo a call to that number.

When the call is answered, an announcement identifying the caller is made to the answering party. In addition, the answering party is prompted to provide disposition information to identify if the call is formally accepted, formally rejected or passively rejected. A formal acceptance occurs when the call is answered and the answering party provides an indication that the call is accepted. This indication may take the form of pressing a key on the phone to transmit a particular DTMF signal or simply maintaining the phone in an "off-hook" state for a specific period of time. A formal rejection occurs when the call is answered and the answering party decides not to accept the call. Similar to a formal acceptance, a formal rejection can include pressing a key to transmit a DTMF signal. In addition, the party can return the receiver to an "on-hook" state within a specific period of time. A call is considered to be successfully routed if a formal acceptance or formal rejection is received. An unsuccessful or failed routing occurs when the call does not result in a formal acceptance or formal rejection. A failed routing, also termed an informal rejection, can take the form of (a) a failure of a call to be answered; (b) the detection of a busy signal; (c) or the answering of the call by an answering machine. Thus, an informal rejection occurs when the call is unsuccessfully routed to the destination.

If the call is formally accepted, the system routes the communication to the destination. If the call is formally rejected, the system routes the communication to a default destination which can be specified by the subscriber. If the call is informally rejected, the system then attempts to route the call to the next destination in the routing list and again requests communication disposition information. The system continues to request communication disposition information from each sequential destination in the routing list until the communication is formally accepted, formally rejected or until the last destination on the routing list is reached. Once the destinations on the routing list have been exhausted, the communication is routed to a last or a default destination. PNS thus includes features similar to call routing, call forwarding, call screening, priority call routing, voice messaging and fax service on a network-based system.

Although the PNS has made substantial advances towards providing seamless access to a subscriber, there is a desire for additional features that can operate to minimize the amount of time required to provide access to a subscriber. For subscribers that utilize routing lists with several destination numbers, the calling party must wait while the subscriber is located. The present invention minimizes this time by determining which destinations have the highest probability of yielding successful results. By creating and retaining this type of information, calls could be routed to the destinations in the routing list based on the probability of successfully completing the call. On the average, this ability would help to reduce the amount of time that a calling party would have to wait in order to contact the subscriber.

Therefore, there is a need in the art for a method that would improve the response time in delivering communications to a called party.

Further, there is a need in the art for a method to route calls in a routing list based system, that given a particular routing list, destinations from within that list can be selected based on the probability of completing the call to that destination.

Furthermore, there is a need in the art for a method to update dynamically the order that a list of numbers is called in order to route calls to a subscriber within the personal number communication system.

SUMMARY OF THE INVENTION

The present invention enhances the PNS by providing a method to improve the speed of routing a call to a subscriber. The improvement is realized by ordering destinations in a routing list based on the probability of completing a call to the destinations. Thus, calls will be routed to destinations in the order of their probability of call success. The present capabilities of the personal number system remain intact with the caveat that prior to sequencing through a selected routing list, the destinations within the list are sorted.

Advantageously, the present invention will decrease the average amount of time required to locate a called subscriber and complete the connection between the calling party and the called subscriber. Thus, the present invention operates to reduce the amount of hold time that a calling party must wait prior to contacting a subscriber. In addition, the present invention limits the amount of system resource time required in setting the call up.

More specifically, the present invention can be implemented within an integrated computer telephony system which includes a call routing system. The speed of routing a call to a subscriber is increased by routing the call based on call completion probability. A subscriber provides a routing list to the system. The routing list includes a set of destination numbers at which the subscriber can be located. A call completion probability indicator is maintained for each destination number in the routing list. The probability indicator is used for arranging the destination numbers into a routing order that gives precedence to destination numbers that are more likely to result in successful routings.

The call completion probability indicator is a statistical measurement of the probability that the user will be located at a particular destination number. One method to provide this information is by using a success counter. The success counter for each destination number is incremented each time a call is successfully routed to that destination. Another method would be to use a failure counter. The failure counter for each destination number is incremented each time a call is routed to a destination number unsuccessfully. Other methods can also be used to implement the call completion probability indicators such as weighted success counters, weighted failure counters or any other statistical means.

The routing order is determined by examining the value of the call completion probability indicator for each destination in the routing list. Regardless of the method employed to implement the probability indicator, the destinations are sorted in descending order based on the call completion probability. Sorting the list in this manner operates to route calls to destinations that have a higher probability of success or where the subscriber is more likely to be located.

To provide the routing service, a destination number is selected from the sorted routing list and the call is directed to that destination number. If the call is answered, disposition information is requested from the answering party. The disposition information is used to determine if the call has been routed to the intended subscriber. If the call is rejected, the destination with the next highest probability indicator is selected from the list and the process is repeated.

Therefore, it is an object of the present invention to enhance the personal number communication system by providing a method to increase the speed of delivering communications between parties It is a further object of the present invention to select destinations from a routing list based on call completion probability.

It is also a further object of the present invention to update dynamically a routing list based on call completion probability.

These and other objects, features, and advantages of the present invention being more clearly understood and appreciated from a review of the following detailed description of the disclosed embodiments and by reference to the appended drawings and claims.

DETAILED DESCRIPTION OF THE PREFERRED EMBODIMENT

The present invention provides an improved method for routing calls to a subscriber based on call completion probability. A subscriber provides a routing list identifying the destination numbers at which the subscriber may be found. As calls or call requests are received and routed to the subscriber per the routing list, the system will dynamically keep track of the number of calls successfully routed to each destination. For each call, the system will arrange the destinations in the routing list based on the number of calls successfully routed to the destinations. Thus, destinations that have a large number of calls successfully routed to them (or have a high probability of call completion), will be tried before destinations that have few successful routings (or a low probability of call completion). Utilizing this method, performance advantages over the known art are gained because on the average, the amount of time to route a call to a party will be decreased.

Public Switched Telephone Network

Figure 1:
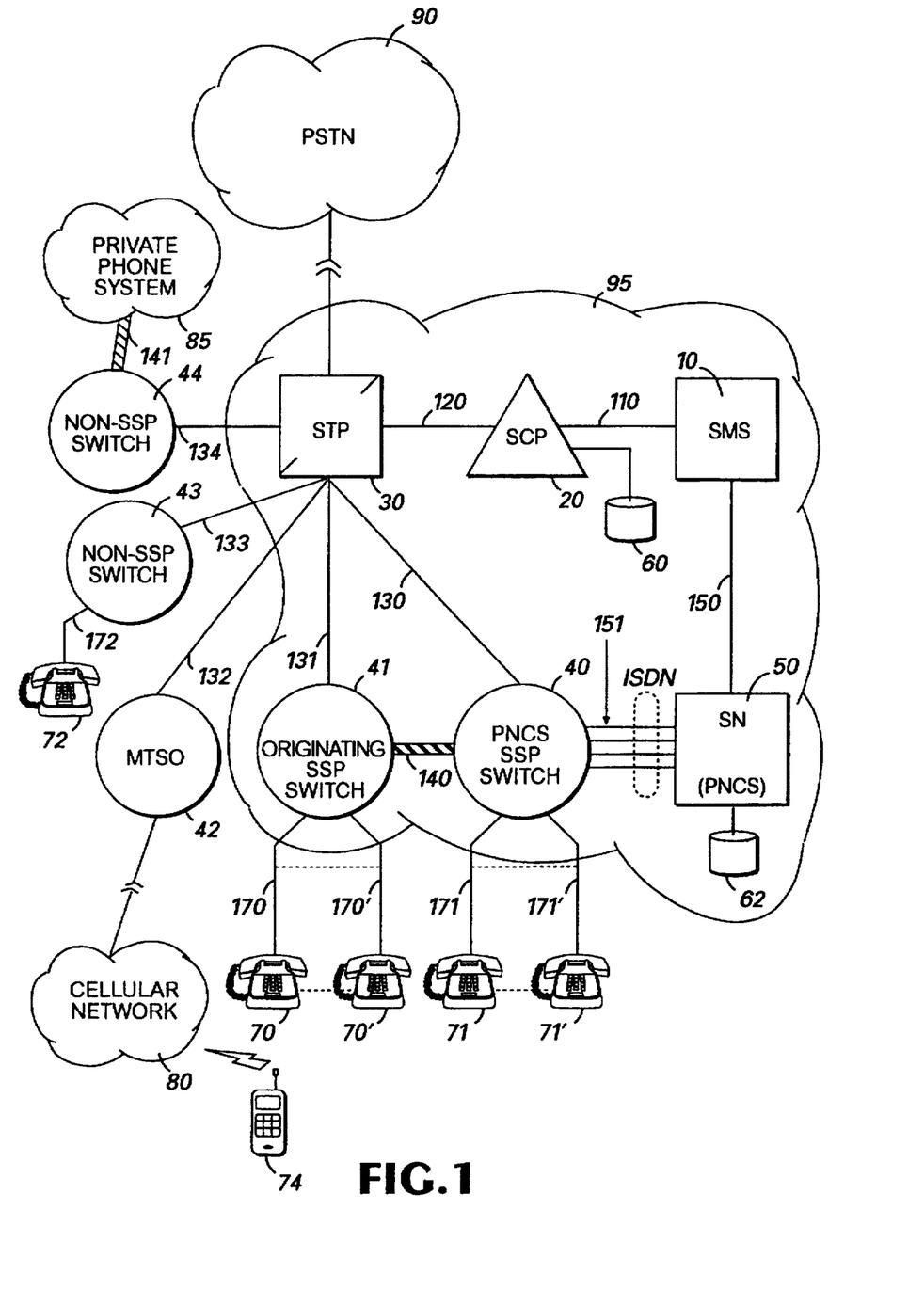
FIG. 1 is a diagram depicting the present invention as operating within the public switched telephone network.

Referring now to the drawings, in which like numerals represent like elements throughout the several figures, the present invention and the preferred operating environment will be described. FIG. 1 is a diagram depicting the present invention as operating within a representative portion of the public switched telephone network 95. Generally, the public switched telephone network is comprised of a variety of interconnected computer systems. The modern configuration of the public switched telephone network operates by centralizing complex operations into specific processing units. The more simplistic functions, such as basic call setup and tear down, remain distributed throughout the network. The representative portion of the public switched telephone network 95 in FIG. 1 is functionally connected to a variety of integrated telephony systems including a cellular network 80, a private phone system 85 and the public switched telephone network 90. This representative portion is typical of configurations provided by the Regional Bell Operating Companies (RBOC) throughout the U.S., and is shown as comprising a Service Management System 10, a Service Control Point 20, a Service Transfer Point 30, Service Switching Points 40 and 41, and a Service Node 50.

FIG. 1 shows the Service Control Point 20 and the Service Management System 10 interfaced over a digital data link 110. The Service Control Point 20 operates in the telephone network to maintain a network database 60 used in determining which subscribers require the support of enhanced services, screening calls, routing calls, and authorizing specific features. The Service Management System 10 performs the higher level functions of the phone network. FIG. 1 also shows a Service Node 50 interfacing to the Service Management System 10 over a digital data link 150. Generally, a Service Node 50 provides resources for performing specialized services for the system and subscribers. FIG. 1 also show Service Node 50 having a database 61.

The Service Switching Points 40, 41 illustrated in FIG. 1 are the modem equivalents of central office switches. Service Switching Points 40, 41 are interfaced to a Service Node 50 via an ISDN link 151. The Service Switching Points 40, 41 interface with each other via a trunk circuit 140. The trunk circuits provide the physical voice paths between parties. Each Service Switching Point services several subscriber lines. Service Switching Point 40 is shown as interfacing with termination equipment 70—70' via subscriber lines 170—170'. Likewise, Service Switching Point 41 services termination equipment 71—71' via subscriber lines 171—171'.

Finally, Signal Transfer Points 30 in the phone network are utilized in linking the Service Switching Points 40, 41 to a Service Control Point 20. Here, Service Control Point 20 interfaces to Signal Transfer Point 30 via digital data line 120 and Signal Transfer Point 30 interfaces with Service Switching Points 40 and 41 via digital data links 130 and 131 respectively.

The representative portion of the public switched telephone network 95 interfaces to the cellular network 80 through digital data line 132 and mobile telephone switching office (MTSO) 42. Thus, calls can be received from or routed to a cellular phone 74. The public switched telephone network must also interface with switching offices that are not compatible with the Service Switching Points. Thus, subscriber line 172 attached to termination equipment 72 can be accessed via switching office 43 and digital data line 133, and the private phone system 85 can be accessed via trunk circuit 141 from switching office 44 on digital data line 134.

Summary of Operation within the PSTN

The present invention can be implemented within the context of the public switched telephone network as depicted in FIG. 1. In this context, the PNS system would operate as a combination of one or more program modules or hardware components on a Service Node 50 being serviced by a Service Switching Point 40. Calls received for a PNS subscriber can be routed to other destinations within the public switched telephone network, cellular phones, private phone systems or to any other destination attached to the public switched telephone network either locally, long-distance or internationally. The database 61 associated with the PNS system at Service Node 50 would be initially loaded with subscriber information (i.e., routing list and subscriber services) by the Service Management System 10.

In operation, an originating party at an originating source 70 could dial the personal number of a PNS subscriber. The Service Switching Point 41 will receive a call attempt to the PNS subscriber and initiate a call setup to the PNS system at Service Node 50 via Service Switching Point 40. The Service Switching Point 40 notifies Service Control Point 20 concerning the call initiation to the PNS system. In response, the Service Control Point 20 initiates the establishment of a voice channel between originating source 70 and Service Node 50 and then routes the call set up attempt to Service Node 50. The Service Node 50 recognizes the incoming call request as a PNS call and initiates PNS processing of the present invention.

Figure 2A:
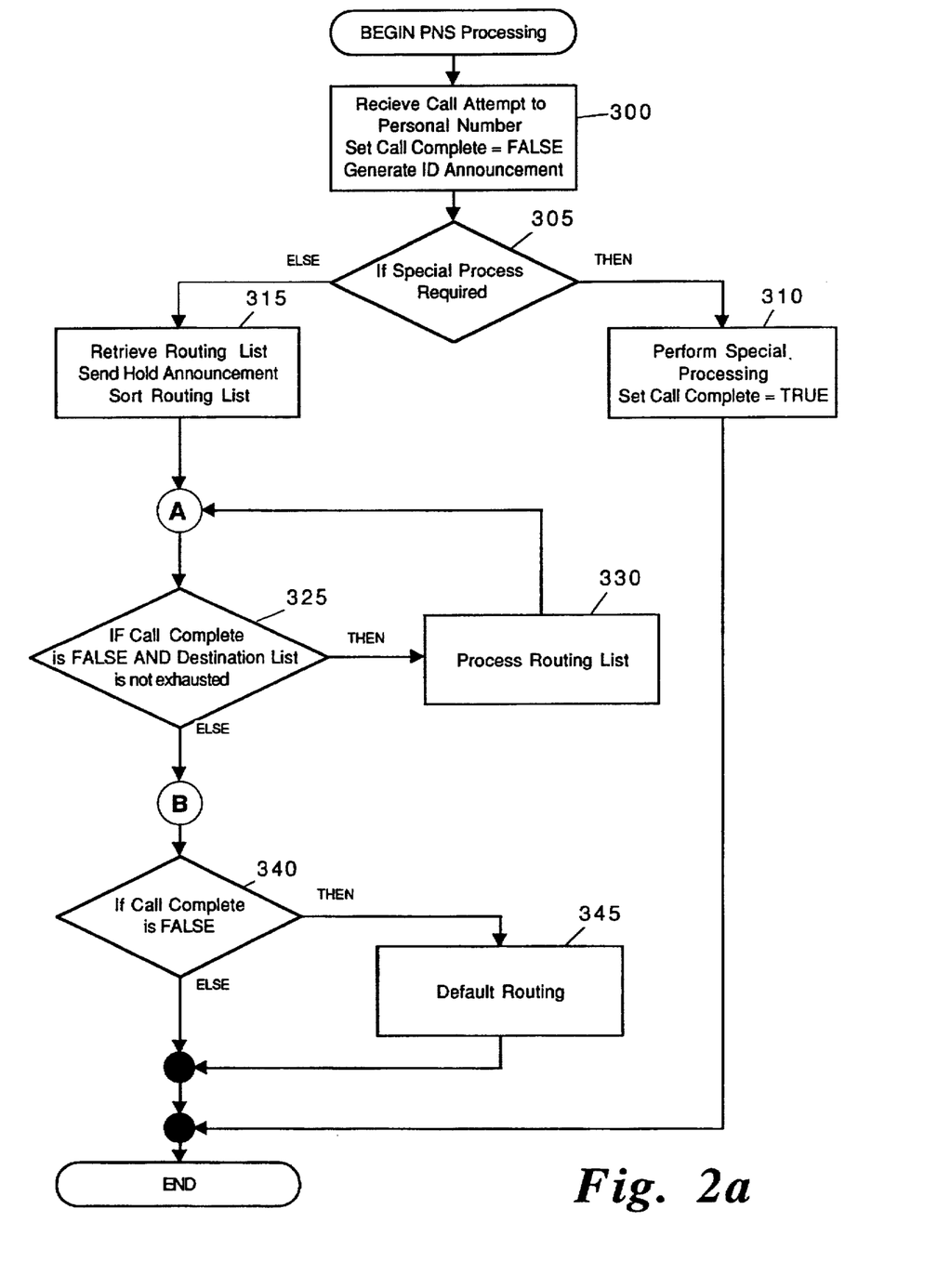
FIGS. 2a–c are flow diagrams illustrating the operation of the PNS in response to receiving a call to a personal number and the enhancements that the present invention provides to the PNS.
Figure 2B:
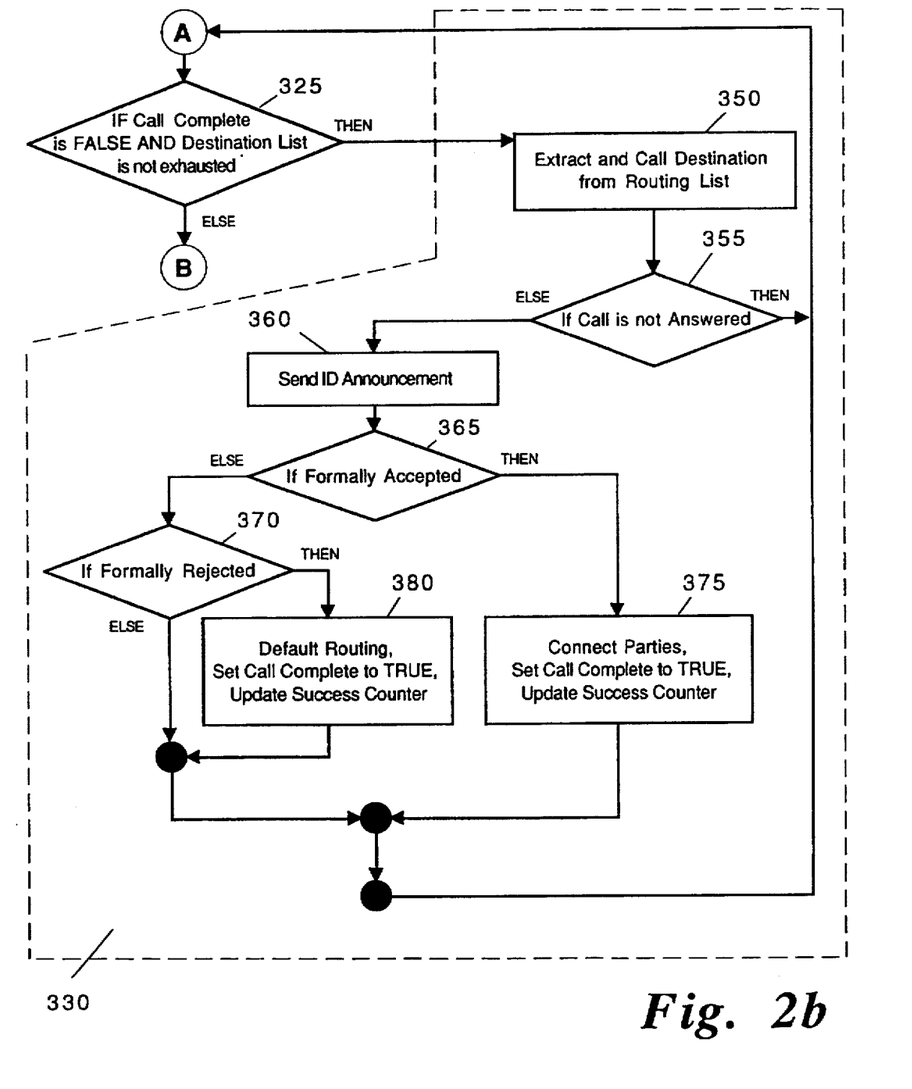

FIGS. 2a and 2b are flow diagrams illustrating the operation of the present invention embodied within the PNS. Turning to FIG. 2a, process block 300 illustrates the reception of the personal number call. In process block 300, a Call Complete indicator is initialized to FALSE and an identification announcement is generated prior to entering decision block 305. In decision block 305, the PNS determines whether the call requires special processing such as facsimile reception or administrative functions. If special processing is required, process block 310 performs the special processing, sets the Call Complete indicator to TRUE and PNS processing 310 is exited. If the call does not require special processing (i.e., the call is for a personal number subscriber), process block 315 is entered. The reader should understand that checking for special processing and acting upon this decision is illustrative of the general operation of the PNS system and is not a necessary component of the present invention.

In process block 315, a routing list is retrieved. The routing list at least includes multiple destinations and a probability indicator for each destination. The routing list is then sorted based on the probability indicators for each destination in the list. In addition, a hold announcement is sent to the originating party. The hold announcement provides audio feedback to the caller indicating that the call is being processed by the PNS. Although FIG. 2a illustrates that the routing list is sorted after it is retrieved, the sorting process could also be performed at other times during the processing of the call. For example, at the completion of the call, the routing list could be updated, sorted and then stored into memory. The process of sorting the routing list includes examining the probability indicators for each destination in the routing list and ordering the destinations in accordance with the value of the probability indicators. Once sorted, the order of the destinations in the routing list will define the routing order for the call.

In the preferred embodiment, the probability indicator for each destination in the routing list is a call success counter. In operation, each time a call is successfully routed to a particular destination number, the corresponding success counter is updated. To qualify as a successful routing, the routed call must be either formally accepted or formally rejected. In one embodiment, the success counter could be incremented by the value of one (1) each time a call is successfully routed to a destination number. Thus, the probability of completing a call to a particular destination in the routing list will be proportional to the success counter. As the number of successful calls completed to a destination increases, the success counter for that particular destination increases. Therefore, if the destinations in the routing list are sorted in descending order according to the value of the respective success counters, then the sorted routing order will have the destinations in the order of probability of call success. On the average, by routing the calls in this order, the number of routing attempts for a particular call will be reduced and the time required to complete the call will be decreased. The method employed in sorting the routing list can take on several forms and it is assumed that those skilled in the art can identify the optimal sorting algorithm for a given scenario. As an example, the "Quick Sort" algorithm could be utilized, as described in *The C Programming Language* 2nd ed. Brian W. Kernighan, Dennis M. Ritchie, pg. 87.

In another embodiment of the present invention, the call completion probability indicator for each destination in the routing list could be a call failure counter. In this embodiment, the failure counter would be updated each time an attempt to route a call to a selected destination number fails. One method to update the failure counter is to increment the counter by one for each unsuccessful routing. In this embodiment, the call failure counter would be proportional to the number of failed routing attempts to a particular destination and would be inversely proportional to the probability of successfully routing a call to the destination. Thus, the sorting algorithm in this embodiment would operate to order the destination numbers in ascending order based on the value of the failure counters.

In another embodiment of the present invention, the call completion probability indicator for each destination in the routing list could be a weighted success counter. In this embodiment, priority could be given to certain classes of calls (i.e., business calls), by incrementing a success counter by differing values. For instance, the weighted success counter may be incremented by one weighted offset (X) for calls received during business hours and incremented by a second weighted offset (Y) for other calls. If X is larger than Y, this will operate to give priority to the business calls. Thus, when the destination numbers are sorted, the destination numbers associated with business calls will have a tendency to be located first in the routing order.

In each of these embodiments, multiple destinations may have equivalent call completion indicators. When this occurs, a default order must be used to determine which destination will be accessed first. This default order can be implemented in several ways. For instance, the order that the numbers are originally entered into the list could be used to determine the default order. Additionally, the users may enter information to define the default order. Regardless of the method employed, the operation of the present invention remains the same. Thus, the present invention is not limited to any specific method for determining a default order.

Entering decision block 325 for the first time, the Call Complete indicator is FALSE and the routing list has not been exhausted. Therefore, the THEN branch of decision block 325 is followed to process block 330. In process block 330, the first destination from the routing list is extracted and an attempt to route the personal number call to the first destination is initiated. Processing will continue between decision block 325 and process block 330 until the call is completed or the routing list is exhausted. When either of these two events occur, decision block 340 will be entered to determine the reason for exiting the loop comprising decision block 325 and process block 330. For the case where the routing list has been exhausted, the THEN branch of decision block 340 is followed to process block 345 where the call is routed to a default destination prior to exiting the PNS operation. Otherwise, the ELSE branch of decision block 340 is followed and PNS processing is exited.

Turning now to FIG. 2b, the details of process block 330 and the operation of the loop including decision block 325 and process block 330 are provided. In process block 350, the first destination number is extracted from the routing list and the personal number call is routed thereto. If the call is not answered at the first destination, the THEN branch of decision block 355 is followed and processing returns to decision block 325. If the call is answered at the first destination, the ELSE branch of decision block 325 is followed to process block 360. Process block 360 operates to transmit the identification announcement to the party answering to the call. The identification announcement can be used to identify the originating party, identify the party the call is intended for, request disposition information concerning the call, or a combination of these three. In either case, once the call is directed to the first destination, the PNS waits for disposition information concerning the call before proceeding to decision block 365. The disposition information can be either an action or inaction by the answering party.

The disposition information will contain a formal acceptance, formal rejection or an informal rejection of the call. If the party formally accepts the personal number call, the THEN branch of decision block 365, is followed to process block 375. In process block 375, a voice path between the originating party and the subscriber is established and the Call Complete indicator is set to TRUE. In addition, in process block 375 the success counter for the selected destination number is updated. After updating the success counter, the modified routing list should be stored in the database. As mentioned earlier, the modified routing list can be sorted at this point or the sorting process can be deferred until the next time the routing list is retrieved. Processing then returns to decision block 325 for the completion of the PNS processing.

If the party formally rejects the personal number call, the ELSE branch of decision block 365 and the THEN branch of decision block 370 are followed and process block 380 is entered. In process block 380, the personal number call is routed to a default destination and then the Call Complete indicator is set to TRUE. In addition, in process block 380 the success counter for the formally rejected destination number is updated and the modified routing list is stored prior to returning to decision block 325. If the call is informally rejected, the ELSE branches of decision blocks 365 and 370 are followed and processing returns to decision block 325. Returning again to FIG. 2a, if the Call Complete indicator is set to TRUE due to a formal acceptance or a formal rejection, the ELSE branch of decision block 325 will be followed to decision block 340. If the Call Complete indicator is set to FALSE but the routing list has been exhausted, this will also result in following the ELSE branch to decision block 340. In either case, processing will then proceed as described above, and the PNS operation will be exited.

Figure 2C:
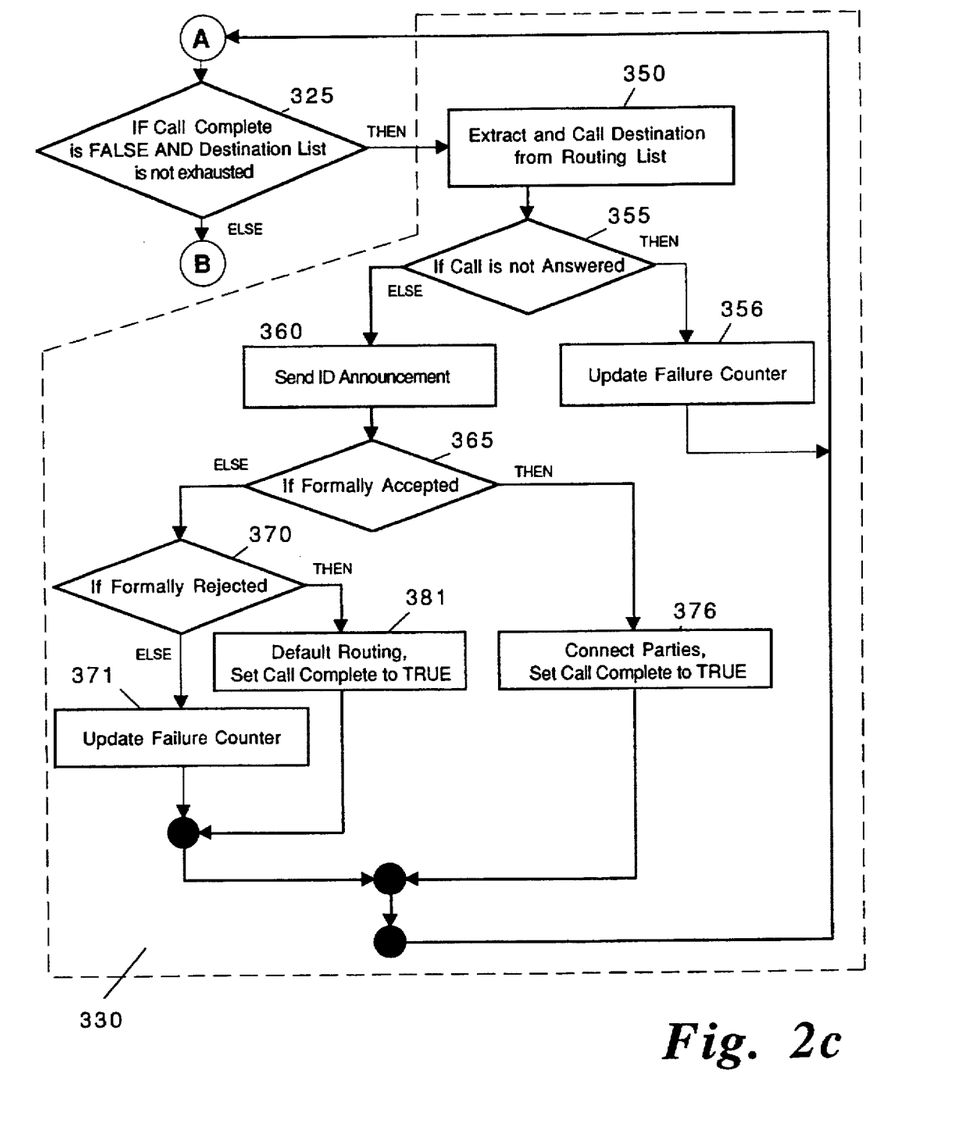

FIG. 2c illustrates a further embodiment of the present invention in which the call probability indicator is comprised of a failure counter. Process block 330 of FIG. 2b is modified in FIG. 2c by the addition of process blocks 356 and 371. In operation, when a call is routed to a destination in process block 350, if the call is not answered, the THEN branch of decision block 355 will be followed to process block 356. In process block 356, the failure counter for the selected destination number will be updated and the new routing list stored. If the call is answered and the answering party informally rejects the call, the ELSE branches of decision blocks 355 and 365 will be followed to process block 371. In process block 371, the failure counter for the selected destination number will be updated and the routing list will be stored. In decision block 365, if the call is formally accepted, the THEN branch is followed to process block 376. In process block 376, the parties are connected and the Call Complete indicator is set to TRUE. In decision block 370, if the call is formally rejected, the THEN branch is followed to process block 381. In process block 381, the call is routed to a default destination and the Call Complete indicator is set to TRUE.

When a failure counter is used for the call probability indicator, the destinations that are least likely to result in a successful routing will have the larger values in the failure counters. Thus, when the routing list is retrieved, the destination numbers 'should be arranged in ascending order based on the failure counters. This will operate to place the destination numbers with the least likelihood of success at the end of the routing order.

Operation within Private Phone Systems

Figure 3:
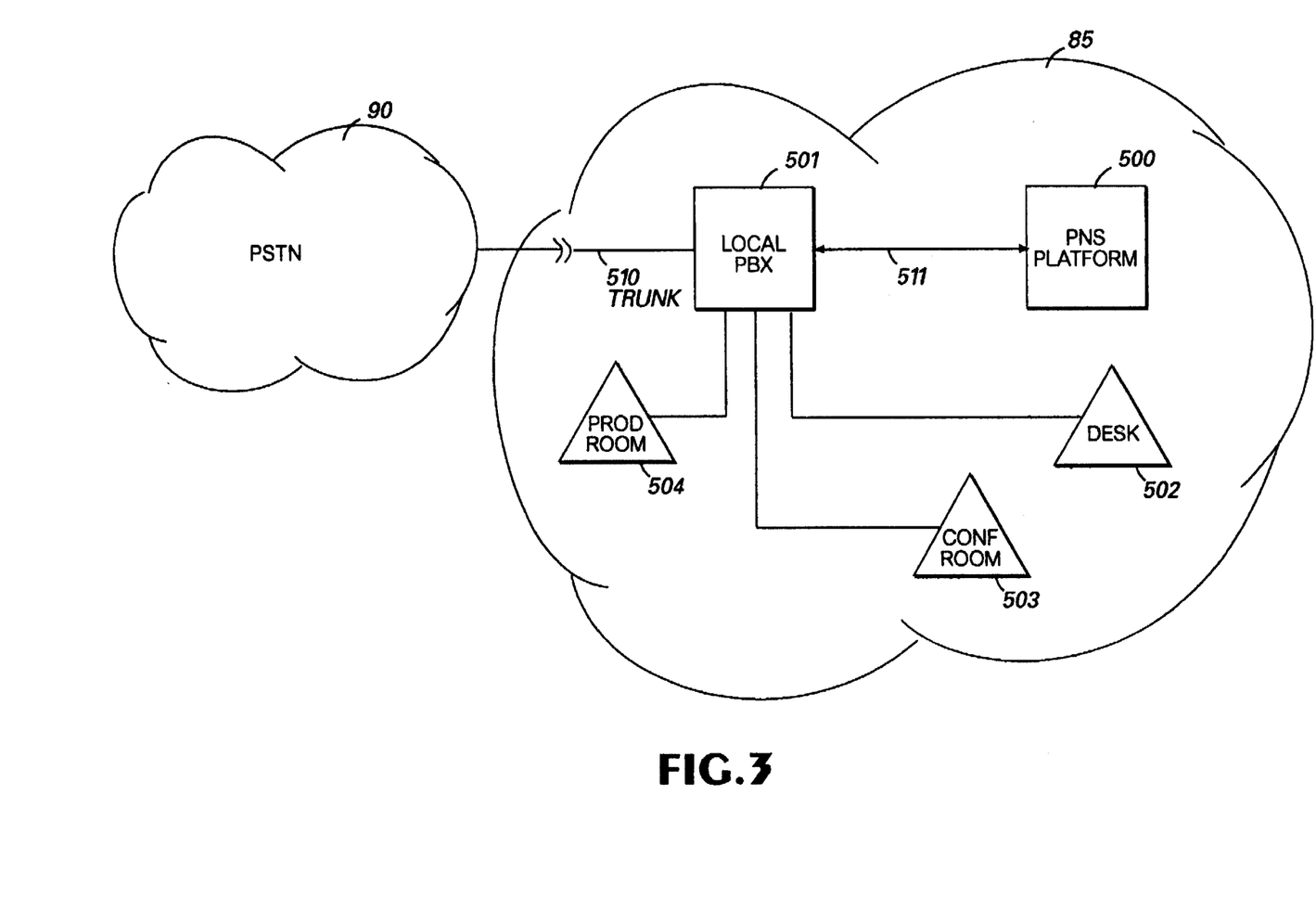
FIG. 3 illustrates the embodiment of the present invention within a private phone system.

In addition to being implemented within the public switched telephone network as discussed above, the present invention can also be implemented within the context of a private phone system. For instance, in a business office or a production factory, individuals may be required to move between locations within the confines of the private phone system. Calls entering the private phone system can be routed to destinations within the office or factory where the called party is likely to be located. FIG. 3 illustrates the embodiment of the present invention within a private phone system 85 utilizing a local private branch exchange (PBX) 501 as the interface to the public switched telephone network 90 through one or more trunk lines 510. Generally, a PBX is a telephony switching system that is either owned or leased by a business and provides switching functions for internal calls and an access to the public switched telephone network. The PNS platform 500 interfaces to the local PBX 501 on interface line 511. In this configuration, the PNS operates to detect calls that are generated within the system as well as external calls coming into the private phone system 85. In response to detecting a call, the PNS platform 500 can then route the call to various locations within the private phone system 85 in accordance with the present invention. Thus, an individual within the private phone system 85 can be reached at their desk 502, a conference room 503, the production room 504 or a plurality of other locations within the private phone system.

Figure 4:
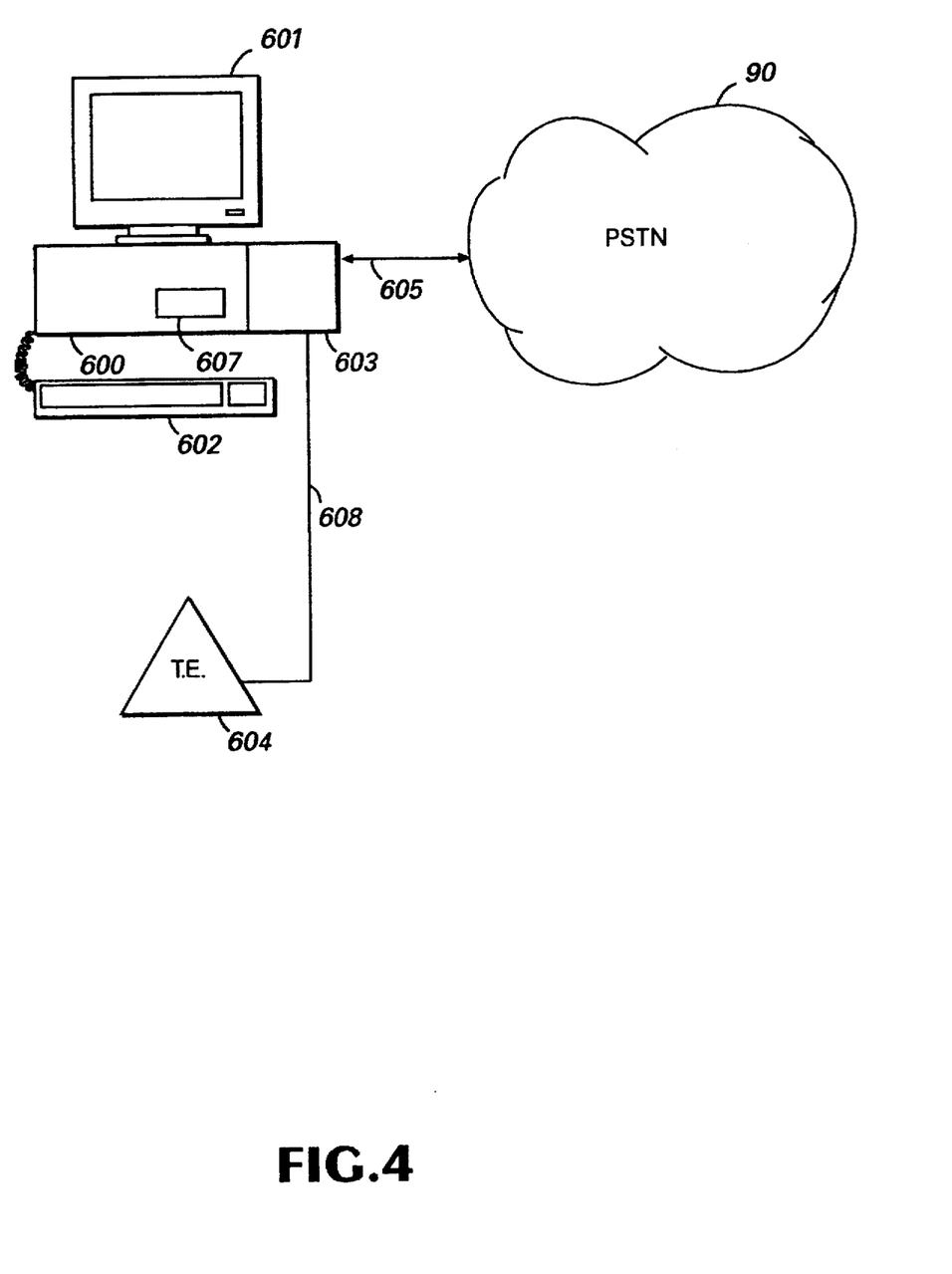
FIG. 4 illustrates another embodiment of the present invention.

FIG. 4 illustrates another embodiment of the present invention. In this embodiment, a conventional personal computer operates as the platform for the present invention which is implemented as a program module with software interfaces to two or more phone lines. The personal computer consist of the processing unit 600 which interfaces to a storage media 607, a display device 601 and a user input device 602. Access to the public switched telephone network 90 is provided through an interface device 603 which supports at least two public switched telephone network subscriber lines 605. In addition, a local terminating device 604 may also be connected to one or more of the subscriber lines through local line 608 and interface device 603.

Routing lists can initially be entered into the PNS platform 600 through the input device 602 or by inserting a storage media 607 containing the routing lists.

The processing unit 600 can detect the reception of a call on one of the subscriber lines by either receiving a signal from interface device 603 or by polling the interface device 603. If a call is received on one of the subscriber lines, the processing unit will operate to retrieve a routing list from storage media 607 and sort the list as per the present invention. Routing attempts can then be made on one of the other subscriber line(s) to the destinations identified in the routing list. When a call is successfully routed, the processing unit can instruct the interface device to bridge the two subscriber lines in order to complete the call. For completed calls to a particular destination, the processing unit will update the call completion probability indicator for that destination.

From the foregoing description, it will be appreciated that the present invention provides a method to decrease the average amount of time to route a call to a party by providing the ability to route calls based on call completion probability. Although the present invention has primarily been described as being embodied in the PNS operating within the public switched telephone network, it can be appreciated that the present invention can be utilized in any telecommunications call routing system. Indeed, the present invention is not limited to any particular telephony system or application. Furthermore, the preferred embodiment has been generally described in the context of the Personal Number Service ("PNS") operating on a Service Node within the public switched telephone network, those skilled in the art will recognize that the present invention also can be implemented on other platforms and within other public and private telephony systems.

The foregoing method of the present invention may be conveniently implemented in one or more program modules as well as hardware components. No particular programming language has been indicated for carrying out the various tasks described above because it is considered that the operation, steps, and procedures described in the specification and illustrated in the accompanying drawings are sufficiently disclosed to permit one of ordinary skill in the art to practice the instant invention. Moreover, in view of the many different types of computers, computer platforms and program modules that can be used to practice the instant invention, it is not practical to provide a representative example of a computer program that would be applicable to these many different systems. Each user of a particular platform would be aware of the language and tools which are more useful for that user's needs and purposes to implement the instant invention.

Alternative embodiments will become apparent to those skilled in the art to which the present invention pertains without departing from its spirit and scope. Accordingly, the scope of the present invention is described by the appended claims and supported by the foregoing description.

I claim:

1. In an integrated computer telephony system including a call routing system, a method for decreasing the average time of routing an incoming call to a party based on call completion probability, comprising the steps of:
    receiving a routing list comprising a plurality of destinations for said party;
    maintaining a probability indicator for ranking said destinations in said routing list according to the number of calls completed to said subscriber at said destination; and
    routing said incoming call to one of said plurality of destinations selected in accordance with said probability indicator ranking.

2. The method of claim 1, wherein each said call completion probability indicator comprises a success counter and said maintaining step further comprises incrementing said success counter for each said call successfully routed to said destination.

3. The method of claim 1, wherein each of said call completion probability indicators comprises a failure counter and said maintaining step further comprises incrementing said failure counter for each said call unsuccessfully routed to said destination.

4. The method of claim 1, further comprising between said maintaining step and said routing step, the step of generating a routing order by arranging said destinations in said routing list based on said call completion probability indicator ranking.

5. The method of claim 4, wherein said probability indicator comprises a success counter and said generating a routing order step further comprises the step of sorting said destinations in said routing list based on the value of said success counters.

6. The method of claim 4, wherein said probability indicator comprises a failure counter and said generating a routing order step further comprises sorting said destinations in said routing list in accordance with the value of said failure counters.

7. The method of claim 4, wherein said routing step further comprises the steps of:
    a. selecting a first destination according to said routing order;
    b. routing said call to said first destination;
    c. receiving communication disposition information from said first destination; and
    d. if said communication disposition information indicates said routing of said call failed, selecting a next destination according to said routing order and repeating steps b–d at said next destination number.

8. In a program module responsive to receiving a communication for a subscriber, a method for routing said communication to said subscriber, comprising the steps of:
    maintaining a routing list for said subscriber, said routing list comprising a plurality of destinations with a call completion probability indicator associated with each of said destinations;
    receiving a communication directed to said subscriber;
    ordering said destinations in said routing list in accordance with said call completion probability indicators; and
    routing said communication to a destination selected according to said ordering.

9. The method of claim 8, further comprising the steps of:
    receiving communication disposition information from said destination; and
    disposing of said communication in accordance with said communication disposition information.

10. The method of claim 9, wherein said disposing step further comprises the steps of:
    if said communication disposition information indicates a formal acceptance of said communication at said destination, updating said call completion probability indicator associated with said destination;
    if said communication disposition information indicates a formal rejection of said communication, updating said call completion probability indicator associated with said destination; and
    if said communication disposition information indicates an informal rejection of said communication, selecting a next destination on said routing list and repeating said receiving step and said disposing step at said next destination.

11. In an integrated computer telephony system comprising a list based call routing system, a method for routing a call to a party, comprising the steps of:
    receiving a call request for said party;
    retrieving an ordered routing list associated with said party, said ordered routing list comprising a plurality of routing destinations organized according to a call completion probability indicator associated with each said routing destination;
    directing said call request to a destination in said plurality of routing destinations selected in accordance with said ordered routing list.

12. The method of claim 11, wherein each of said routing destinations comprise a destination number.

13. The method of claim 12, wherein each of said call completion probability indicators comprise a success counter, and said directing step further comprises the steps of:

13 a. selecting a destination number according to said ordered routing list;
b. routing said call request to said destination number;
c. if said routing is successful, incrementing said success counter associated with said destination number; and
d. if said routing is unsuccessful, selecting a next destination number according to said routing list and repeating steps b–d at said next destination number.

14. The method of claim 12, wherein each of said call completion probability indicators comprise a failure counter, and said directing step further comprises the steps of:
a. selecting a destination number according to said ordered routing list;
b. routing said call request to said destination number;
c. if said routing is unsuccessful, incrementing a failure counter for said destination and selecting a next destination number according to said ordered routing list and repeating steps b–c at said next destination number.

15. The method of claim 12, wherein each of said call completion probability indicators comprise a weighted success counter, and said directing step further comprises the steps of:
a. selecting a weighted offset based on the type of call received;
b. selecting a destination number according to said ordered routing list;
c. routing said call request to said destination number;
d. if said routing is successful, adding said weighted offset to said success counter associated with said destination number; and
e. if said routing is unsuccessful, selecting a next destination number according to said routing order and repeating steps b–e at said next destination number.

16. A computer system for providing a call routing service for a subscriber based on a plurality of call completion probability indicators, each of said indicators having an associated destination number, comprising:

a processing unit;
a memory storage device operative to store a plurality of routing lists associated with said subscriber, said routing lists comprising said probability indicators and said associated destination numbers;
an interface device coupled to said processing unit for detecting call setup requests;
said processing unit being operative to:
detect a call setup request on said interface device for said subscriber;
retrieve a routing list for said subscriber from said memory storage device;
sort said routing list to generate a routing order for said call setup request; and
direct said call setup request in accordance with said routing order.

17. The computer system of claim 16, wherein said processing unit is operative to sort said routing list by ordering each said associated destination number in said routing list in accordance with said probability indicators.

18. The computer system of claim 16, wherein each said probability indicator comprises a success counter and said processing unit is further operative to direct said call setup request by:
a. selecting a destination number according to said routing order;
b. routing said call setup request to said destination number;
c. if said routing of said call request is formally accepted, modifying said routing list by incrementing said success counter associated with said destination number;

14 d. if said routing of said call request is formally rejected, modifying said routing list by incrementing said success counter associated with said destination number; and
e. if said routing of said call request is informally rejected, selecting a next destination number according to said routing order and repeating steps b–e at said next destination number.

19. The computer system of claim 16, wherein each said probability indicator comprises a failure counter and said processing unit is operative to direct said call setup request by:
a. selecting a destination number according to said routing order;
b. routing said call setup request to said destination number;
c. if said routing of said call request is informally rejected, modifying said routing list by incrementing said failure counter of said destination number, and
selecting a next destination number according to said routing order and repeating steps b–c at said next destination number.

20. A computer-readable medium on which is stored a computer program for routing communications based on call history, and a routing list for a subscriber, said routing list comprising a plurality of call completion probability indicators for associated destination numbers, said computer program comprising instructions which, when executed by a computer, perform the steps of:
receiving a communication for said subscriber;
retrieving said routing list from said medium;
sorting said destination numbers in said routing list based on said call completion probability indicators to generate a routing order; and
directing said communication to a destination number selected in accordance with said routing order.

21. The computer-readable medium recited in claim 20, wherein said call completion probability indicators comprise a success counter and said directing step further comprises the steps of:
a. selecting a destination number in accordance with said routing order;
b. routing said communication to said destination number;
c. if said subscriber acknowledges receipt of said communication, incrementing said success counter associated with said destination number; and
d. if said subscriber does not acknowledge receipt of said communication, selecting a next destination number in accordance with said routing order and repeating steps b–d at said next destination number.

22. The computer-readable medium recited in claim 20, wherein said call completion probability indicators comprise a failure counter and said directing step further comprises the steps of:
a. selecting a destination number in accordance with said routing order;
b. routing said communication to said destination number; and
c. if said subscriber does not acknowledge receipt of said communication, incrementing said failure counter and selecting a next destination number in accordance with said routing order and repeating steps b–c at said next destination number.

* * * * *